United States Patent [19]

Hashimoto et al.

[11] Patent Number: 4,493,050

[45] Date of Patent: Jan. 8, 1985

[54] ELECTRONIC TRANSLATOR HAVING REMOVABLE VOICE DATA MEMORY CONNECTABLE TO ANY ONE OF TERMINALS

[75] Inventors: Shintaro Hashimoto, Ikoma; Masafumi Morimoto, Yamatokoriyama; Tosaku Nakanishi, Nara; Hideo Yoshida, Kashihara; Shigenobu Yanagiuchi, Tenri, all of Japan

[73] Assignee: Sharp Kabushiki Kaisha, Osaka, Japan

[21] Appl. No.: 286,466

[22] Filed: Jul. 24, 1981

[30] Foreign Application Priority Data

Jul. 31, 1981 [JP] Japan ................. 55-106886

[51] Int. Cl.³ .............................. G06F 15/38
[52] U.S. Cl. ........................................ 364/900
[58] Field of Search ... 364/200 MS File, 900 MS File

[56] References Cited

U.S. PATENT DOCUMENTS 4,383,306 5/1983 Morimoto et al. .............. 364/900

FOREIGN PATENT DOCUMENTS

2014765 8/1979 United Kingdom ............. 364/200

Primary Examiner—Gareth D. Shaw
Assistant Examiner—Ronni S. Malamud
Attorney, Agent, or Firm—Birch, Stewart, Kolasch & Birch

[57] ABSTRACT

An electronic translator is characterized in that a voice memory for storing voice data of translated words is detachably connectable to any one of at least two terminals of the translator. A detection circuit is provided for detecting which of the terminals is occupied by the voice memory. A voice generator through is provided for generation voice synthesization of the voice data of the translated words.

3 Claims, 12 Drawing Figures

| LANGUAGE CODE (LC) | | | | | | | LANGUAGE |
|---|---|---|---|---|---|---|---|
| 0/1 | x | x | x | 0 | 0 | 0 | 1 | ENGLISH |
| 0/1 | x | x | x | 0 | 0 | 1 | 0 | GERMAN |
| 0/1 | x | x | x | 0 | 0 | 1 | 1 | JAPANESE |
| 0/1 | x | x | x | 0 | 1 | 0 | 0 | FRENCH |
| 0/1 | x | x | x | 0 | 1 | 0 | 1 | SPANISH |
| 0/1 | x | x | x | 0 | 1 | 1 | 0 | --- |
| 0/1 | x | x | x | 0 | 1 | 1 | 1 | --- |
| 0/1 | x | x | x | 1 | 0 | 0 | 0 | --- |
| 0/1 | x | x | x | 1 | 0 | 0 | 1 | --- |
| 0/1 | x | x | x | 1 | 0 | 1 | 0 | --- |
| 0/1 | x | x | x | 1 | 0 | 1 | 1 | --- |
| 0/1 | x | x | x | 1 | 1 | 0 | 0 | --- |
| 0/1 | x | x | x | 1 | 1 | 0 | 1 | --- |
| 0/1 | x | x | x | 1 | 1 | 1 | 0 | --- |

| FIELD CODE | FIELD |
|---|---|
| 0 0 0 | GENERAL |
| 0 0 1 | ENGINEERING |
| 0 1 0 | ECONOMY |
| 0 1 1 | LAW |
| 1 0 0 | --- |
| 1 0 1 | --- |
| 1 1 0 | --- |
| 1 1 1 | --- |

| | KIND OF ROM |
|---|---|
| 0 | FOR WORDS AND SENTENCES |
| 1 | FOR VOICE DATA |

ELECTRONIC TRANSLATOR HAVING REMOVABLE VOICE DATA MEMORY CONNECTABLE TO ANY ONE OF TERMINALS

BACKGROUND OF THE INVENTION

The present invention relates in general to a word information storage and retrieval device and, more particularly, to an electronic translator for providing efficient and rapid retrieval of any desired word or words stored therein.

Recently, a new type of electronic device called an electronic translator has been available on the market. The electronic translator differs from any conventional type of electronic device in that the former is of a unique structure which provides for efficient and rapid retrieval of word information stored in a memory.

Some electronic translators have been capable, according to voice data stored in a voice memory to produce a synthetic speech output each time the operator enters word data. In such translators, however, the voice memory is connected to specific terminals of one of the translators, conventionally. Since the voice data occupies a large number of addresses in the memory for storage purposes, some times as large as the word data, it is highly desirable to connect the voice memory to any one of the translator terminals by composing a voice memory having no word data.

This enables that the individual voice memory is connected to any one of the terminals, regardless of connection of a different voice memory.

SUMMARY OF THE INVENTION

Accordingly, it is an object of the present invention to provide an improved electronic translator having a detachable voice memory for storing a great amount of voice data.

It is another object of the present invention to provide an improved electronic translator for enabling a desirable expansion of voice data by using at least two kinds of voice memories, and a suitable combination of one voice data memory and one word data memory, in that a voice data memory is additionally and detachably connected to any one of terminals of the translator.

Briefly described, in accordance with the present invention, an electronic translator is characterized in that a voice memory for storing voice data of translated words is detachably connectable to any one of at least two terminals of the translator. A detection circuit is provided for detecting which of the terminals is occupied by the voice memory. A voice generator is provided for generation of an audible output from the voice synthesization of the voice data of the translated words.

BRIEF DESCRIPTION OF THE DRAWING

The present invention will become more fully understood from the detailed description given hereinbelow and accompanying drawing which is given by way of illustration only, and thus are not limitative of the present invention and wherein:

FIGS. 9(1), 9(2) and 10 show a flow chart of operation of this translator according to the present invention.

DESCRIPTION OF THE INVENTION

First of all, any language can be applied to an electronic translator of the present invention. An input word is spelled in a specific language to obtain an equivalent word, or a translated word spelled in a different language corresponding thereto. The languages can be selected freely.

Figure 1:
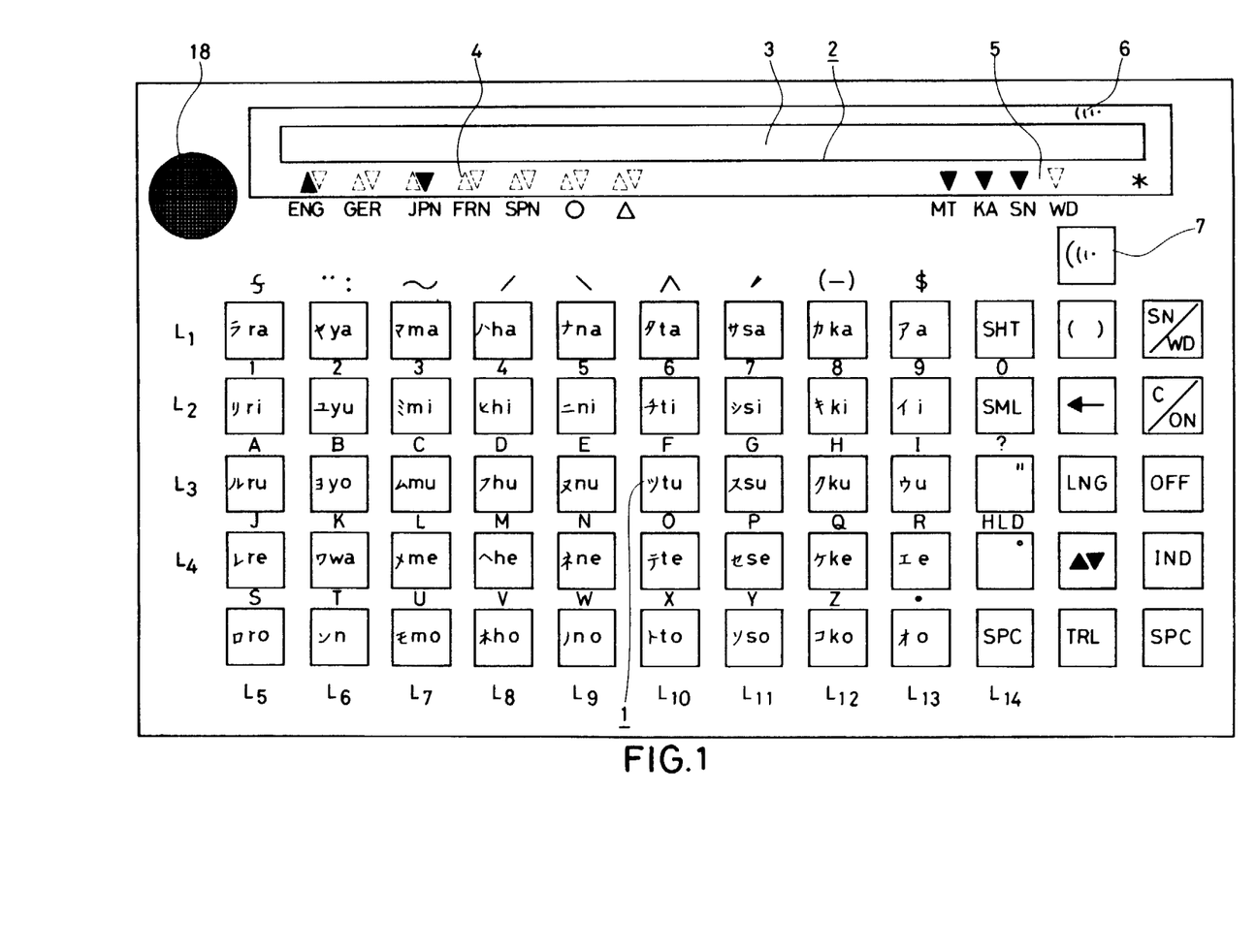
FIG. 1 shows a plan view of an electronic translator according to the present invention.

Referring now to FIG. 1, there is illustrated an electronic translator according to the present invention. The translator comprises a keyboard 1 containing a Japanese syllabary keyboard, an alphabetical keyboard, a symbol keyboard, and a functional keyboard, an indicator 2 including a character indicator 3, a language indicator 4 and a symbol indicator 5.

The character indicator 3 shows characters processeed by this translator. The language indicator 4 shows symbols used for representing the kind of the mother language and the foreign language then being processed by the translator. The symbol indicator 5 shows symbols used for indicating operating conditions in this translator.

A symbol 6 is illuminatable for showing that a word or sentence presently displayed in the character indicator 3 can be audibilized according to voice synthesization techniques. A voice key 7 is provided for enabling voice generation of the word or sentence while the symbol 6 is illuminated. A speaker 18 is provided for generating an audible output by voice synthesization.

Figure 2:
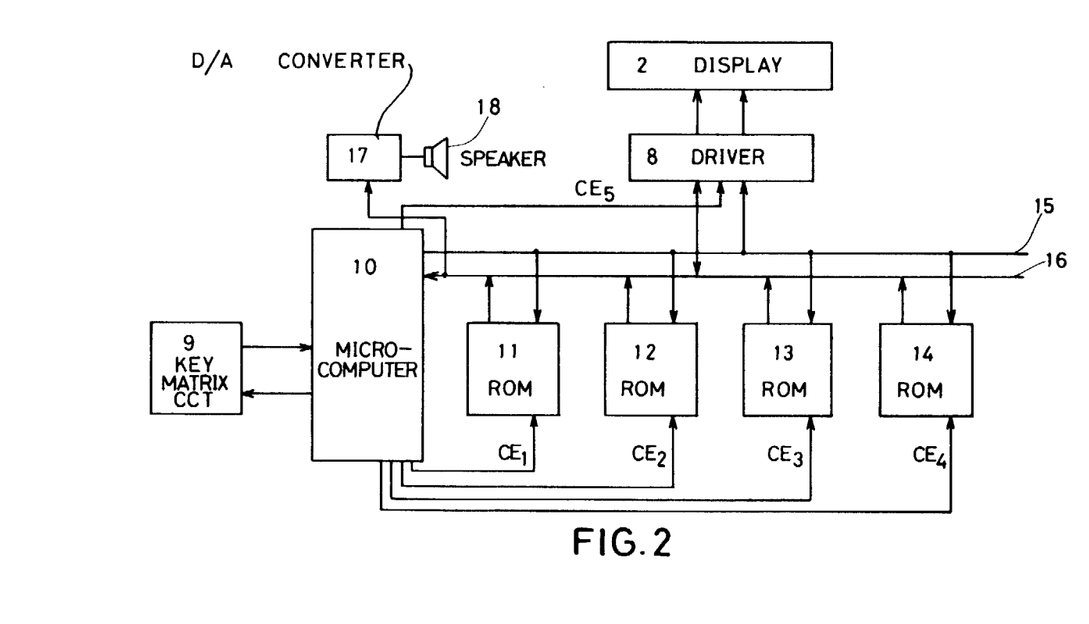
FIGS. 2 and 3 show block diagrams of a control circuit implemented within the translator as shown in FIG. 1.

FIG. 2 shows a block diagram of a control circuit implemented in the translator. The circuit comprises the display 2, a driver 8, a key matrix circuit 9, a microcomputer 10, a word ROM 11, and detachable ROM's 12 to 14.

The circuit 9 functions with the keyboard 1 of FIG. 1. The circuit 9 is connected to terminals of the microcomputer 10 for developing key strobe signals and key input signals. Each of the ROM's 12 to 14 contains words and/or sentences or voice data used by the translator.

According to a preferred embodiment of the present invention, each one of the ROM's 11 to 14 corresponds to one language. For example, the ROM 11 stores a plurality of English words and sentences, the ROM 12 stores a number of Japanese words and sentences and the ROM 13 stores a number of German words and sentences. Preferably, the ROM 11 is built into the translator so that it can not be removed from the translator for exchange purposes. However, it is preferable that each of the ROMs 12 to 14 can be removed from the translator and replaced by another type of ROM as a module to permit the user to translate between the mother language (here English) and additional foreign languages such as French or Spanish (see FIG. 1).

Each of the ROM's 11 to 14 is connected to the microcomputer 10 through an address bus 15 and a data bus 16. Chip selection signals $CE_1$, $CE_2$ and $CE_3$ are developed by the microcomputer 10 to select one of the ROM's 11 to 14. Words and/or sentences are applied to the microcomputer 10 from the selected ROM. $CE_5$ indicates a chip selection signal for the driver 8.

A D/A converter 17 may be provided for enabling D/A conversion of the data on the data bus 16 so that the speaker 18 may be operated to audibilize the voice data according to voice synthesization.

Each of the ROM's 12 to 14 is connected, in a detachable manner to the translation circuit. It may contain a plurality of various kinds of verbal information for words and/or sentences in a language. For description, three units of the ROM's are indicated in FIG. 2. The number of this type of ROM should not be limited to three. While each of the ROM's 12 to 14 contains words or sentences in a digital code, the voice data ROM contains a great number of different kinds of voice data information in a digital code. A specific pronunciation is enabled by combining selected kinds of verbal information through access of the microcomputer 10 to the voice data ROM.

Figure 3:
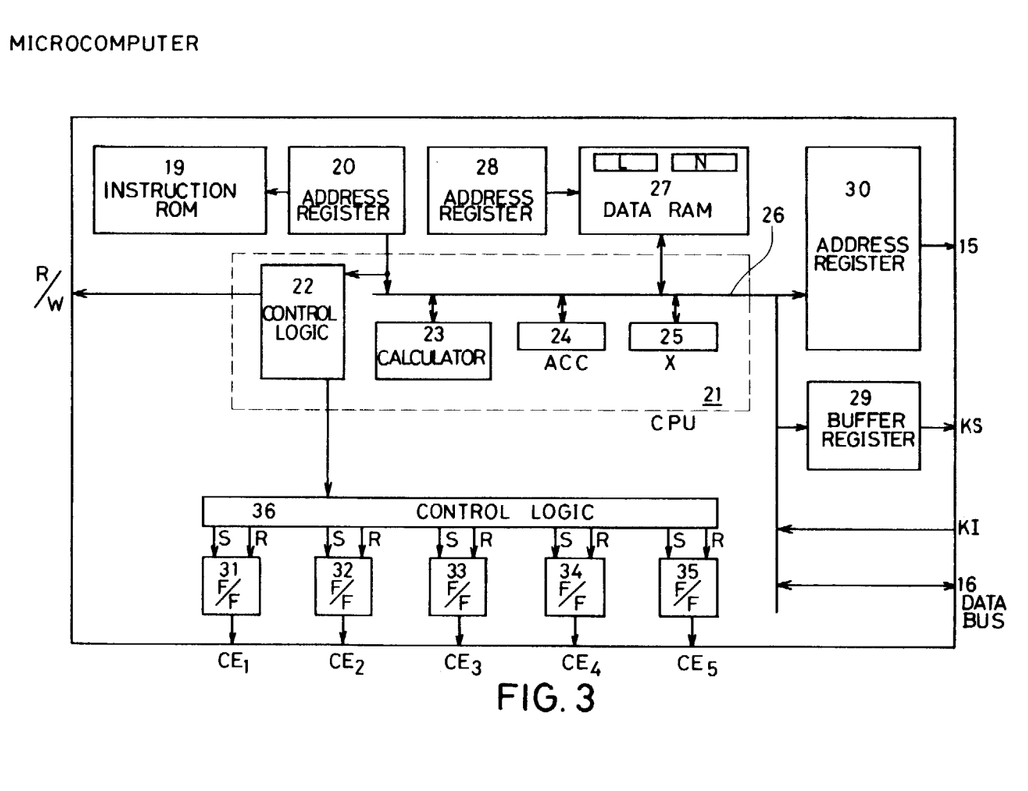

FIG. 3 shows a block diagram of the microcomputer 10 of FIG. 2. An instruction ROM 19 stores a number of kinds of instructions, each of which is used to perform a specific operation by the translator and is, preferably, in coded format. As the address of a ROM address register 20 is, in turn, advanced, the ROM 20 provides a specific instruction. The specific instruction is applied to a CPU 21 so that the CPU 21 understands its instruction to provide the selected operation.

The CPU 21 comprises a control logic 22, a logic calculator 23, an accumulator 24, and an additional register 25. An interval data bus is indicated by the reference 26. Data RAM 27 is provided for containing data used for the translator and for functioning as a conditional flip-flop used for a branch in a program operation. Data from the CPU 21 is stored in a specific location within the data RAM 27 which is selected by a RAM address register 28. The data stored in such a location of the RAM 27 is applied to the CPU 21.

Numeral 29 represents an output buffer register for outputting key strobe signals KS in turn to the key matrix circuit 9 so that the output of this circuit 9 is applied to the CPU 21 as key input signals KI. Reference numeral 30 indicates an address register for selecting the address of the external memory including the ROM's 11 to 14 and a RAM circuit within the driver 8. The output of the address register 30 is fed through the address bus 15. Control of the address register 30 to selectively increment or decrement and to locate a certain address is carried out by the CPU 21. Since the CPU 21 is coupled to the data bus 16 as shown in FIG. 2, transmission of the data between the CPU 21 and the external memory is accomplished by use of the data bus 16. The direction of transmission of the data between them is defined with the read/write signal R/W.

Each of flip-flop circuits 31 to 35 is set or reset by a control logic 36. The control logic 36 is controlled by the CPU 21. The output of each of the flip-flops 31 to 35 is referred to as chip selection signals $CE_1$ to $CE_5$, respectively.

Figure 4:
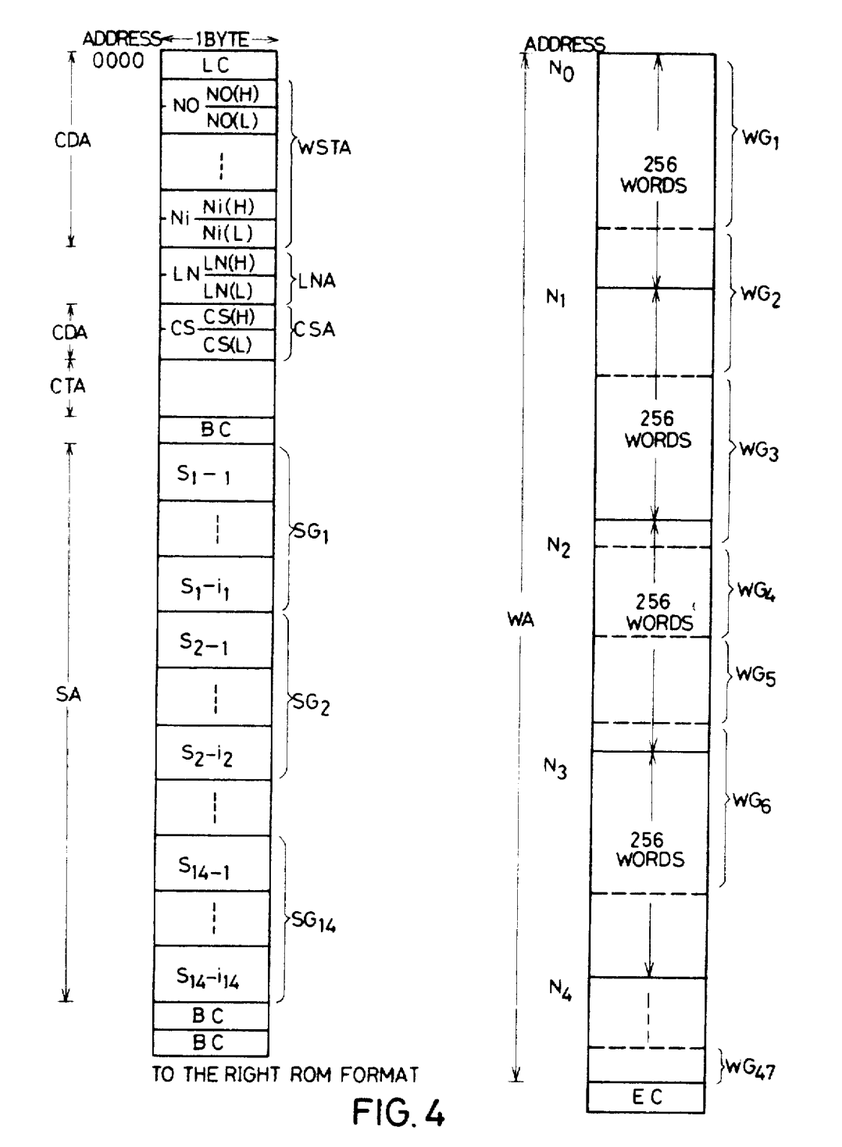
FIG. 4 shows a format of a ROM for storing words, the ROM being connected in the circuit of FIG. 2.

FIG. 4 shows a format in which a great number of words are stored in each of the ROM's 11 to 14. This format contains a control data region CDA, a data-compression table CTA, a sentence data region SA and a word data region WA.

Each of the words is stored in the ROM such that its spelling is compressed. For example, in the ROM 11, a pair of words "AN" is stored as a compressed code of 1 byte, $CC_1$. Another pair of words "BA" is stored as a compressed code of 1 byte, $CC_2$. Frequency in occurrence of spelling of English words is determined to detect those spellings having high frequency in occurrence. The thus selected English spelling is changed to corresponding compression codes for data storage purposes. The data-compression table CTA stores data for ascertaining the correspondence between the selected spellings and the compression codes.

When correspondence between an input word and one or words stored in one of the ROM's is to be detected, the input word is changed to codes inclusive of one of the compression codes according to the contents of the data-compression table CTA since each of the ROM's stores codes which may include one of the compression codes. The table CTA is used to show words stored in one of the ROM's by changing the codes to the original spelling. This table is different depending on the language to make the degree of data compression the greatest.

Stored words are classified in 47 categories, in each of which a number of words are ordered. In FIG. 4 a word category "n" is referred to WGn. Sentences are formed by a combination of a plurality of stored words. These sentences are classified in 14 categories, in each of which a number of sentences are ordered. In FIG. 4 a sentence category "m" is referred to SGm containing a first sentence $S_{m-1}$ to a last sentence $S_{m-im}$. Each of the categories belonging to each of the word categories WG1 to WG14 corresponds to each of the sentence categories SG1 to SG14.

The following table shows the relationship between the serial number of the category and the name of the category.

TABLE 1-1

| The serial number of the category | corresponding key | the name of the category |
|---|---|---|
| 1 | "ra" or "c" | airplane |
| 2 | "ri" or "I" | customs |
| 3 | "ru" or "A" | transporting machine |
| 4 | "re" or "J" | at hotel |
| 5 | "ro" or "S" | in restaurant |
| 6 | "m" or "T" | sight seeing |
| 7 | "mo" or "U" | amusement |
| 8 | "ho" or "V" | shopping |
| 9 | "no" or "W" | direction |
| 10 | "to" or "X" | business |
| 11 | "so" or "Y" | service |
| 12 | "ko" or "Z" | conversation |
| 13 | "O" or "." | at medical practitioner's Office |
| 14 | "SPC" or "o" | emergency |

Each category for the words may contain 256 words. A first word address table region WSTA contains a first address referred to as $N_0, N_1, N_2, \ldots N_i$ in FIG. 4. This first address is related to a location in which a first code or first compressed code for representing the first word is stored. In accordance with a specific example of the present invention, each address is represented by two bytes. Each first address is separated into an upper byte referred to No(H) to Ni(H) and a lower byte referred to No(L) to Ni(L). The first word address table region is used to shorten retrieval time for a specific word.

CS is used to refer to a first sentence address CS(H) and CS(L) which is stored in a first sentence address region CSA. LNA indicates a memory location for storing a serial number of a word indicating the specific language as referred to LN of LN(H) and LN(L). More particularly, as the ROM storing English words is concerned, a word "English" is necessarily contained in that ROM. In such a case, serial the number of the word "English" in the ROM is LN starting from the first word of the same kind of word group. Storing the serial number LN is suitable for showing the mother language and the foreign language being selected in the character indicator 3 because it is unnecessary to additionally store a word showing the language.

The translator of the present invention may comprise audible sound generating means for developing words represented in the mother language and/or the foreign language. Since such an audible sound generating means is disclosed in, for example, Hyatt, U.S. Pat. No. 4,060,848 issued Nov. 29, 1979, further description thereof is omitted.

In FIG. 4, BC, "11111111" is a boundary code and EC "11111111" is an end code of the ROM.

Figure 5:
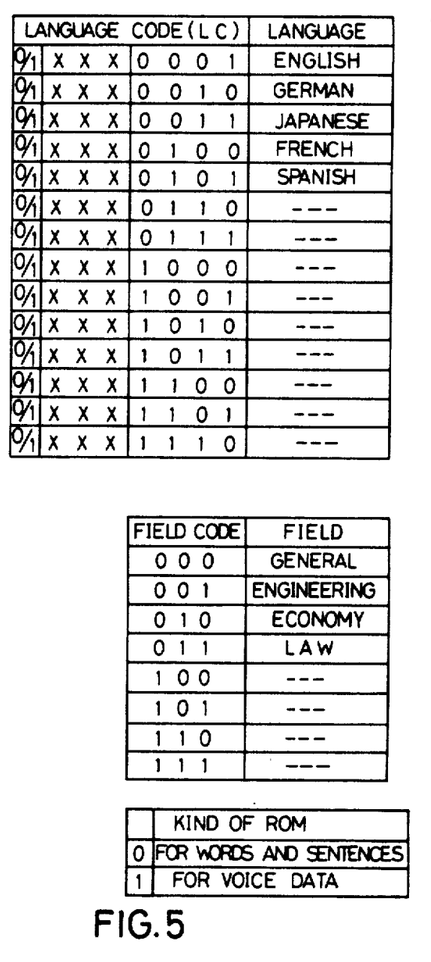
FIG. 5 shows a table for representing details of language codes used in the format of FIG. 4.

FIG. 5 shows a table for representing a language code LC. The language code LC comprises 8 bits. The first four bits indicate the kind of language stored in the ROM, bits 5 to 7 indicate a field of language stored in the ROM, and the highest bit indicates the kind of word and sentence data or voice data. "0" in the highest bit represents that the word and sentence data are stored, while "1" in the same bit represents that the voice data are stored.

The field of language means that the words stored therein are directed to one of a group of fields, such as general, engineering, economy, and, law etc.

OPERATION OF THE TRANSLATOR (1) Display:

With reference to FIG. 1, the letter indicator 3 displays alphabetical characters, Japanese "Katakana" letters, figures and symbols. The language indicator 4 displays the marks "▲" and "▼". The symbol indicator 5 contains the symbols MT, KA, SN and WD as specified with the symbol "▼", and the star "*". Indication of these symbols is enabled under control of the driver 8 by retrieving corresponding word data from the microcomputer 10.

(2) Translation principle:

The system of FIG. 2 has the capability of translating two to four languages from one to another. A specific type of ROM stores a great number of words and sentences as is shown in FIG. 4. Each of the stored words and sentences corresponds to a respective one of the translated words and sentences in the other ROM's. This correspondence is assured by the numbers of words and sentences which are in common between the ROM's. More particularly, a specific sentence "GOOD MORNING." is assumed to be stored as the 100th sentence in a ROM that stores data corresponding to English words and sentences.

The corresponding Japanese sentence is stored as the 100th sentence in another ROM that is related to Japanese. A further corresponding German translated sentence "GUTEN MORGEN." is stored similarly as the 100th sentence in a further ROM that is related to German.

Similarly, the same technique can be applied in connection with words so that a specific word ordered at a particular serial number in one ROM corresponds to its translated word ordered at the like serial number in another ROM.

Conducting the translation by the translator lies in finding the serial number of a word or a sentence in the mother language ROM and, accordingly thereafter, in detecting the translated word or sentence having the serial number in the foreign language ROM.

The translation operation comprises the following steps:

(i) the first step: selecting a specific ROM of the mother language;

(ii) the second step: detecting the serial number of a desired word or a sentence in the thus selected ROM;

(iii) the third step: selecting another specific ROM of the selected foreign language; and (iv) the fourth step: detecting the translated word or sentence having the like serial number in the other selected ROM.

Figure 6:
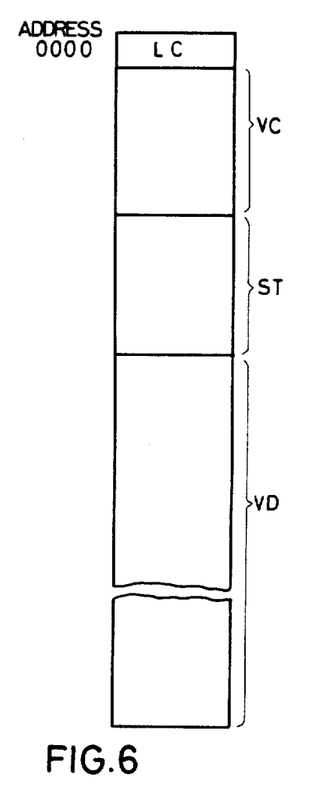
FIG. 6 shows a format of a voice data ROM for storing voice data, the voice data ROM being connectable to the circuit of FIG. 2.

FIG. 6 shows a format in which the voice data is stored in the ROM for the voice synthesization. In FIG. 6, VC is a table region for specifying a certain block of the voice data. ST is a table region for enabling the voice synthesization. VD is a data region for storing the voice data.

Figure 7:
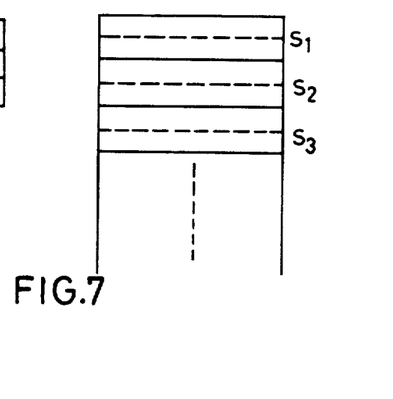
FIG. 7 shows part of a table for specifying blocks of the voice data of FIG. 6.
Figure 8:
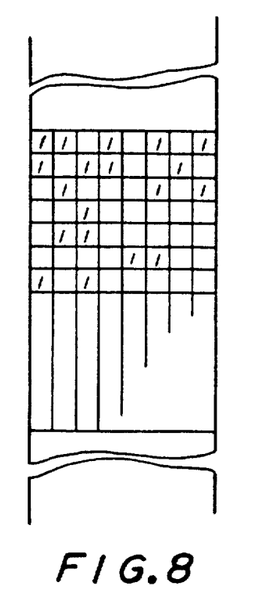
FIGS. 8 and 11 are part of another table for allowing the voice data to be outputted from the voice data ROM.
Figure 9:
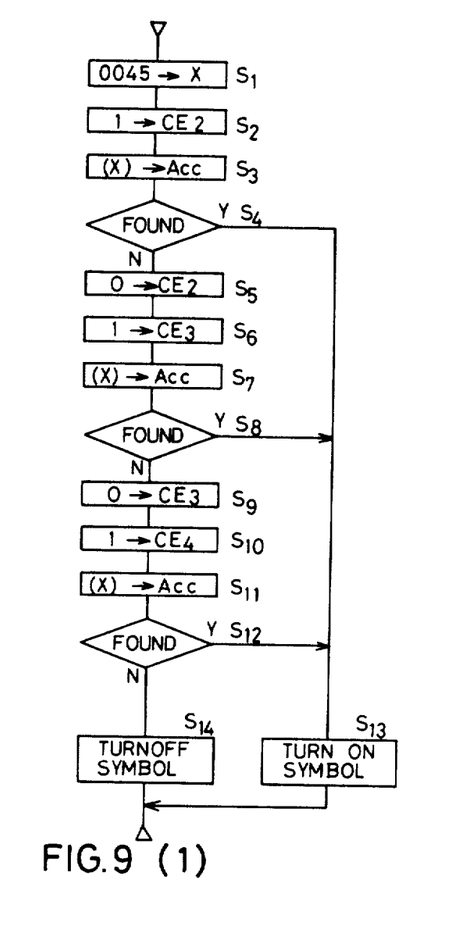

FIGS. 7 and 8 show a table for specifying the table region VC and a table for specifying the table region ST, respectively.

In the table of FIG. 8, each 1 byte is utilized for showing whether each eight sentences or words are accompanied by some voice data for the voice synthesization or not. In this table, for example, words or sentences numbered as the 1st, 2nd, 4th, 6th, 8th, 9th, 11th, ... are accompanied by the voice data while words or sentences numbered as the 3rd, 5th, 7th, 10th, 13th are not accompanied by any voice data.

In the table of FIG. 7, $S_1$ represents a location for storing a voice data starting address of the word or sentence numbered as the 1st. $S_2$ represents a location for storing a voice data starting address of the word or sentence numbered as the 2nd. $S_3$ represents a location for storing a voice data starting address of the word or sentence numbered as the 4th. The other voice data starting addresses are stored in the later locations in order.

FIGS. 9(1) and 9(2) show flow charts for detecting to which terminal of the translator the ROM for storing the voice data is connected, according to the present invention. With reference to FIG. 9(1), "0045" in hexadecimal notation is applied into the additional register 25 in the circuit of FIG. 3 in $S_1$. The chip selection signals $CE_2$ is outputted in $S_2$. The contents in the address of the ROM, say, 12 selected by the additional register 25, are entered into the accumulator (ACC) 24 in $S_3$. "0045" is an address for storing the language code LC. Now, the accumulator 24 contains the language code for the ROM 12.

$S_4$ is selected to compare the language code for specifying the language to be audibilized and the contents of the accumulator 24. The operation of FIG. 9(1) is carried out after any word or sentence is translated by retrieving any translated word or sentence, to provide the voice synthesization of the translated one. In $S_4$, the language code of the ROM obtained by this retrieval is compared with the contents of the accumulator 24. If they do not correspond, the chip selection signal $CE_2$ is made invalid so that the chip selection signal $CE_3$ is generated in a valid manner.

Subsequently, the language code of the ROM 13 is read in S$_5$→S$_6$→S$_7$. This language code is compared in the similar manner. When correspondence of the language code and the contents of the accumulator 24 is detected in S$_8$, the symbol 6 of FIG. 1 is illuminated in S$_{13}$ to represent that the voice synthesization of the translated language of the ROM 13 is possible. When no correspondence is detected even after all the ROMs for storing the word or sentence data are examined, the symbol 6 is kept turned off in S$_{14}$.

The detections in S$_4$, S$_8$ and S$_{12}$ in the flow chart of FIG. 9(1) are enabled as shown in the flow chart of FIG. 9(2). With reference to the flow chart of FIG. 9(2), n1 is selected to detect whether the 8th bit (the highest bit) of the language code inputted into the accumulator 24 is "1" or not. If so, n2 is selected to detect whether the 1st to the 7th bits of the language code are identical with the 1st to the 7th bits of the language code of the ROM for storing the voice data of the word or sentence data.

The language code from the ROM is stored at a particular location L of the data ROM 27 in the circuit of FIG. 3. When an answer to the step in n2 is "YES", the table ST of the ROM for enabling the voice synthesization is retrieved in n3. Step n4 is selected to determine whether the word or sentence in question is accompanied by any voice data or not.

The detection in n4 is accomplished by retrieving the voice data table according to the serial number of the word or sentence stored in a particular location N of the data RAM 27.

Figure 10:
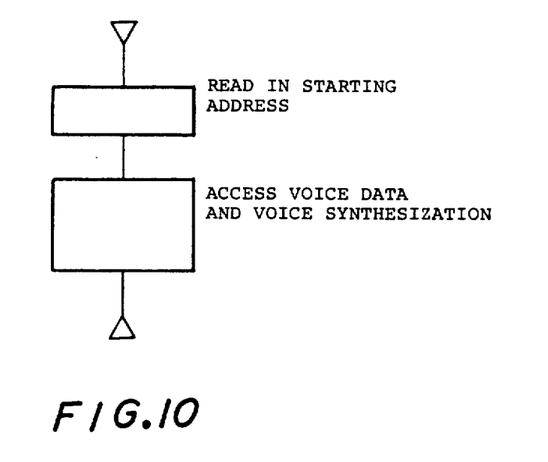

When the symbol 6 is turned on, the voice key 7 is actuated to read-in the voice data starting address as shown in FIG. 10. The voice data is then accessed to provide the voice synthesization.

Figure 11:
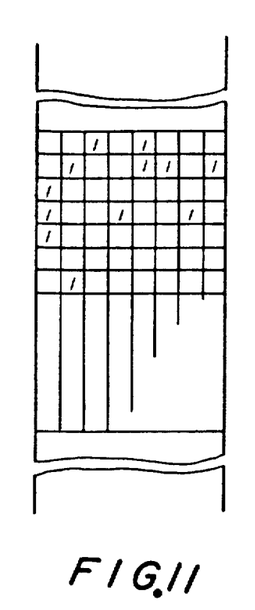

Even in the case where at least two ROM's are used to store one kind of voice data as shown in FIG. 11, the flow charts of FIGS. 9(1) and 9(2) can be enabled to detect whether the voice data is stored or not, as in the case of FIG. 8. In the case of FIG. 8, the voice data for the word or sentence which is not any voice data must be stored in a different unit of ROM.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An improved electronic translator wherein a first word or words in a first language are entered to obtain a second word or words in a second language that are the translated equivalent of the first word or words, the translator comprising input means for entering the first word or words into the translator and for entering commands, a permanently included first memory means for storing a plurality of words in the first language including the first word or words, the plurality of words being stored at respectively specific addresses, second memory means for storing a like plurality of words in the second language including the second word or words, each of the plurality of words in the second memory means being stored at a specific address that is equivalent to the address of a corresponding word in the first memory means, at least two connectors, third memory means for storing voice data corresponding to the translated equivalents of at least some of the first word or words in another language, the third memory means being removably connected to the translator through one of the connectors, first access means responsive to the input means for accessing the first memory means and the second memory means to retrieve the first word or words and the translated equivalent second word or words, detection means responsive to the input means and the first access means for detecting which connector has the third memory means connected thereto, for detecting whether the voice data stored in the third memory means corresponds to second word or words in the second language, and for detecting whether the third memory means includes voice data equivalent to the second word or words, indicator means responsive to the detection means for indicating whether voice data representing the second word or words in the second language is stored in the third memory means, second access means responsive to the input means and the detection means for retrieving from the third memory means voice data representing the second word or words in the second language, and voice generation means responsive to the second access means for producing an audible output of the second word or words by voice synthesization of the voice data.

2. An improved electronic translator according to claim 1, wherein the third memory means has a bit code stored therein to indicate whether voice data corresponding to each respective second word or words are stored therein.

3. An improved electronic translator according to claim 2, wherein there is further included display means responsive to the first access means for displaying the second word or words that are retrieved.

* * * * *

UNITED STATES PATENT AND TRADEMARK OFFICE
CERTIFICATE OF CORRECTION

PATENT NO.   : 4,493,050
DATED        : January 8, 1985
INVENTOR(S)  : S. HASHIMOTO et al It is certified that error appears in the above-identified patent and that said Letters Patent is hereby corrected as shown below:

```
     On the title page;
   In Section [30], change:
''Jul. 31, 1981 [JP]   Japan ..................55-106886' to
--Jul. 31, 1980 [JP]   Japan ..................55-106886--.
```

Signed and Sealed this

Twentieth Day of August 1985

[SEAL]

Attest:

DONALD J. QUIGG

Attesting Officer     Acting Commissioner of Patents and Trademarks